United States Patent
Beneker et al.

(10) Patent No.: US 7,581,790 B2
(45) Date of Patent: Sep. 1, 2009

(54) CONTINUOUSLY ADJUSTABLE SEAT BACK HINGE MOUNTING

(75) Inventors: Wilfried Beneker, Leichlingen (DE); Wilhelm Wingensiefen, Wermelskirchen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 204 days.

(21) Appl. No.: 11/657,883

(22) Filed: Jan. 25, 2007

(65) Prior Publication Data

US 2007/0170763 A1 Jul. 26, 2007

(30) Foreign Application Priority Data

Jan. 25, 2006 (DE) .................... 20 2006 001 252 U

(51) Int. Cl.
*B60N 2/02* (2006.01)

(52) U.S. Cl. ..................................... 297/366

(58) Field of Classification Search ................ 297/366, 297/367, 368, 369, 370, 371, 372, 373, 374
See application file for complete search history.

(56) References Cited

U.S. PATENT DOCUMENTS 4,591,207 A * 5/1986 Nithammer et al. ......... 297/366
4,884,845 A * 12/1989 Schmale et al. ............. 297/367

FOREIGN PATENT DOCUMENTS

EP 0741056 5/1996

* cited by examiner

*Primary Examiner*—Milton Nelson, Jr.
(74) *Attorney, Agent, or Firm*—McCarter & English, LLP

(57) ABSTRACT

A seat back hinge mounting has a toothed element firmly connected to the seat back and a detent element associated with the seat carrier. The detent element includes an arcuate region with teeth that are adapted to be brought into engagement with the teeth of the toothed element, a long hole through which the pivot extends making the detent element movable in such a manner that the teeth are movable into and out of engagement with the teeth of the toothed element, and first and second inclined surfaces disposed on the free end turned away from the seat back and disposed diagonally opposite each other and forming a V-like shape that tapers toward the free end of the detent element. The hinge has first and second spring-loaded eccentric discs fastened for rotation about a respective axis of rotation (Y-Y) on the seat carrier.

12 Claims, 2 Drawing Sheets

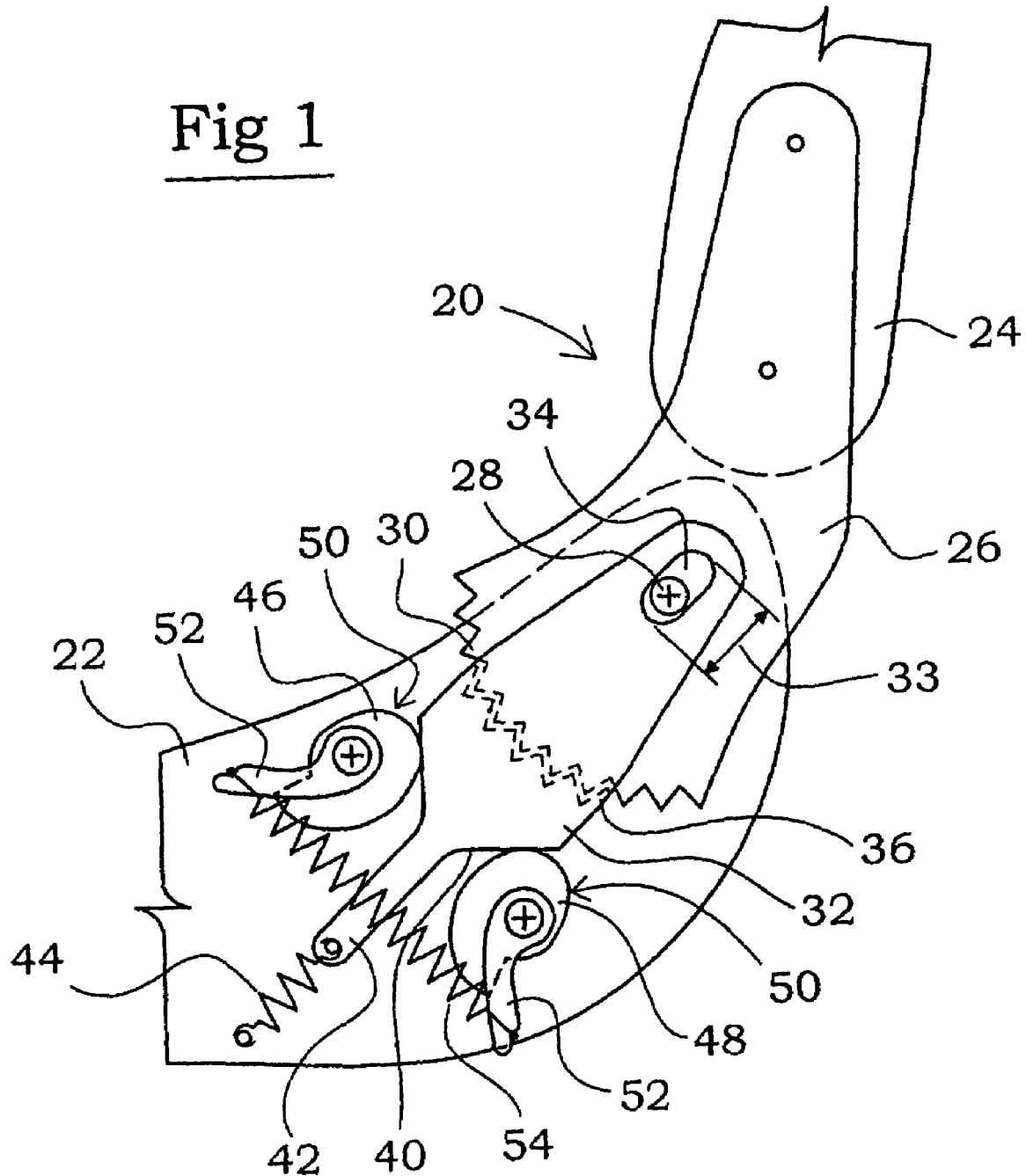

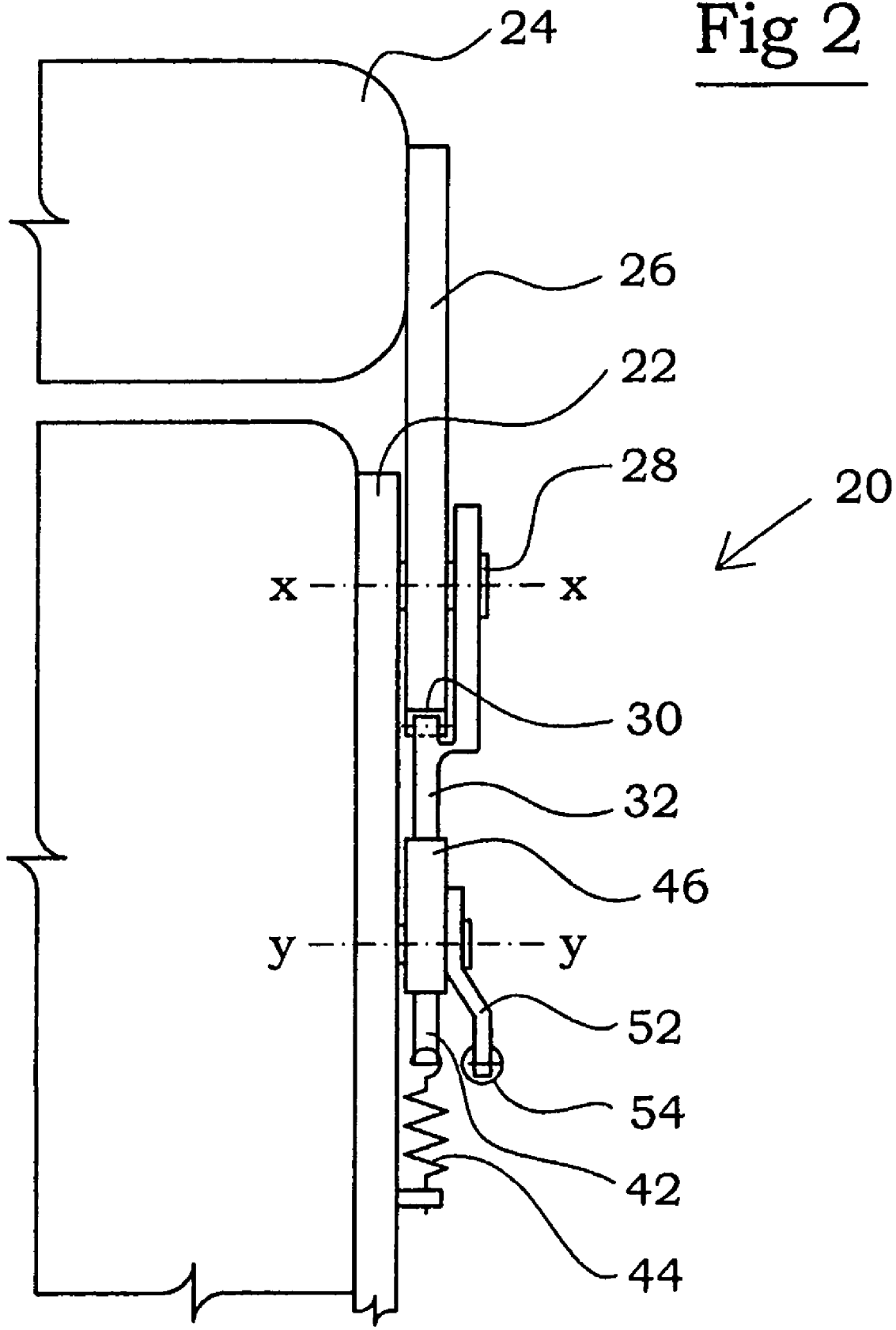

CONTINUOUSLY ADJUSTABLE SEAT BACK HINGE MOUNTING

CROSS REFERENCE TO RELATED APPLICATIONS

This application claims priority to German Application No. DE 20 2005 001 252.4, filed Jan. 25, 2006, the contents of which are expressly incorporated by reference in their entirety as part of the present disclosure.

BACKGROUND

The present invention relates to a continuously adjustable seat back hinge mounting for a motor vehicle seat comprising a seat carrier and a seat back.

Usually, seat backs of motor vehicle seats are configured to be tilt-adjustable in order for the motor vehicle seat to be individually adaptable to the respective user. For this purpose, a seat back hinge mounting for pivoting the seat back is provided between the seat carrier and the seat back. Usually, such a motor vehicle seat also includes an underframe that is height-adjustable and comprises a lengthwise adjustment mechanism for example. The term seat carrier is meant to include any structure that is directly or indirectly adapted for use as a seat pan and that, as a rule, supports a seat cushion.

Motor vehicles are known in which the seat back is implemented to be tilt-adjustable some degrees, but there also exist seat backs that can be tilted all the way back to a sleeping position.

A major demand placed on the seat back hinge mounting is that it should allow for as easy and convenient an adjustment operation as possible on the one side while on the other side firmly connecting the seat back to the seat carrier for safety reasons. This is important because a seat back folding backward in the event of an accident may cause serious injuries to the user.

Seat back hinge mountings using an electric motor to allow for angular adjustment are known. Although such an electric motor allows for continuous adjustment of the seat back, it is cost prohibitive and depends for operation on an energy supply. Alternatively, mechanical seat back hinge mountings are known for detent adjustment. These mechanical seat back hinge mountings are lower in cost and do not need a source of energy; but, as a rule, they are not continuously adjustable.

The adjustment mechanisms allowing for continuous tilt-adjustment generally are of a very complicated construction and not very convenient to operate. The reason therefore often is that, since the tilt-adjustment is to be performed continuously, an adjustment wheel must be rotated many times in order to adjust the seat back. Usually, it is not possible to provide an absolutely zero clearance connection. Even if such a zero clearance connection is provided at the beginning of the useful life, clearance due to wear cannot be avoided after repeated used.

A generic seat back hinge mounting is shown in the document EP 0741056 A1 for example. FIG. 5 in particular illustrates a seat back hinge mounting that is purely mechanical and in which tilt adjustment is only possible in very small steps. The almost continuous adjustment is made possible through meshing teeth, one toothed element being fixed to the seat back and having teeth cooperating with an adjusting element fixed to the seat carrier. The disadvantage of this embodiment is that a zero clearance fit cannot be ensured in the long run. Also, genuine continuous adjustment is not possible.

It is the object of the present invention to provide a seat back hinge mounting for a motor vehicle seat that allows for continuous adjustment of the seat back tilt angle. It is intended that the seat back hinge mounting does not need any electric motor and is still easy and convenient to operate. Moreover, the seat back hinge mounting is intended to ensure zero clearance during the entire useful life thereof.

SUMMARY

In accordance with the invention, this object is achieved by a seat back hinge mounting for a motor vehicle seat comprising: a seat carrier, a seat back, the seat back being pivotal about a pivot disposed on the seat, a toothed element that is firmly connected to the seat back and has a free arcuate end with teeth and is pivotal about a pivot axis (X-X) extending through the pivot. A detent element is associated with the seat carrier and includes an arcuate region with teeth that is implemented and disposed in such a manner that the teeth of the detent element are adapted to be brought into engagement with the teeth of the toothed element, and a long hole through which the pivot extends that is oriented in such a manner and has a length such that the detent element is movable in such a manner that the teeth of the detent element are movable into and out of engagement with the teeth of the toothed element. Further, the detent element includes a first inclined surface that is disposed on its free end turned away from the seat back and a second inclined surface that is also disposed on its free end turned away from the seat back, with the two inclined surfaces being disposed diagonally opposite and forming together an approximate V-like shape that tapers toward the free end of the detent element. Additionally, the mounting comprises a first eccentric disc and a second eccentric disc, each being fastened for rotation about a respective axis of rotation (Y-Y) on the seat carrier, the first eccentric disc contacting with its external surface the first inclined surface and the second eccentric disc contacting with its external surface the second inclined surface. The eccentric discs are spring-loaded in such a manner that they urge the detent element over the inclined surfaces toward the toothed element and retain the teeth in engagement.

The seat back hinge mounting of the invention allows for continuous tilt adjustment of the seat back. Depending on the implementation of the seat back hinge mounting, more specifically of the toothed segment, the seat back may be tilted to the horizontal so that the motor vehicle seat can be brought into a sleeping position. Additionally, the seat back hinge mounting only has very few components and is very robust. The number of mobile parts in particular is very low. A major advantage also is that the toothed element and the detent element may be snap-fitted together through quite coarse teeth so that a secure and resistant connection is achieved.

The seat carrier and the seat back are joined together through the seat back hinge mounting. At the bottom part of the seat back, the toothed element is so to say centered on the pivot axis. The detent element, which, through a long hole, is oriented toward the pivot axis of the seat back extending through a pivot disposed on the seat carrier, but is otherwise freely movable, engages the toothed element. It is this free movability or pivotability of the detent element that finally allows for continuous adjustment. For pivoting the detent element also allows to change the incline of the toothed element and, as a result thereof, of the seat back. The detent element is fixed in the desired position through two eccentric discs that are mounted for rotation on the seat carrier and are sufficiently loaded by a spring for them to urge the detent element through two inclined, diagonally opposite surfaces of the detent element toward the toothed element, thus moving the teeth of the detent element into, and maintaining them in, engagement with the teeth of the toothed elements.

The seat back hinge mounting is released by an actuation mechanism causing the two eccentric discs to rotate against the tension spring for the detent element to come free. The detent element, which has now come free, may either be pivoted while still in engagement with the toothed element, or be moved out of engagement with the toothed element by a longitudinal displacement over the length of the long hole. When the toothed and the detent element are out of engagement, the toothed element and, as a result thereof, the seat back are free to pivot about the pivot axis.

Advantageously, there is provided another spring element for pulling the detent element out of meshing engagement with the toothed element when the eccentric discs are released. The advantage thereof is that only one mechanism needs to be actuated for completely free adjustment of the seat back.

The seat back hinge mounting is locked by the detent element first engaging in the closest tooth engagement of the toothed element and being retained in this position through the eccentric discs that have again come free.

The seat back hinge mounting of the invention is of a very small construction but has high force transmission thanks to the coarsely toothed features. There are no problems of synchronization on seat backs that are blocked on either side and the seat back hinge mounting is also suited for use in integrated seats, thanks to the robust, coarsely toothed feature. Eventually, the tooth division does not influence adjustment comfort and the required zero clearance is also durably ensured.

The two eccentric discs, the detent element and the toothed element are disposed in such a manner relative to each other that self-locking occurs in all the lockable positions. This is achieved by the inclined surfaces of the detent element coming into contact with circumferential surfaces of the eccentric discs in such a manner that an angle ensuring self-locking is obtained between a perpendicular and an imaginary line passing through the point of rotation of the eccentric discs. The angle depends on the material and is of up to approximately 7.degree. when steel comes onto steel. Self-locking prevents the seat back from causing the toothed element and, as a result thereof, the detent element to incline without undoing the contact between the eccentric discs that are firmly fastened to the seat carrier.

The eccentric discs may for example be spring-loaded by spiral springs disposed in the region of the axes of rotation of the eccentric discs. The spiral springs are disposed and implemented so that the eccentric discs are always urged by the force of the spring into the direction leading toward the toothed element for a movement of the detent element.

Alternatively, there may be provided a traction spring which connects the two eccentric discs together and causes them to move toward each other. By causing levers to move toward each other, each lever being firmly connected to a respective one of the eccentric discs, the eccentric discs are also caused to rotate so as to urge, through their circumferential surfaces, the inclined surfaces of the detent element toward the toothed element for example.

In principle, the seat back hinge mounting may be made from any suited material. Particularly suited however are materials having a resistance allowing to comply with all the automobile safety regulations. Insofar, steel is a particularly suited material.

The detent element may advantageously comprise an extended portion that adjoins the two inclined surfaces and extends between the two eccentric discs. On this extended portion, there is advantageously disposed a traction spring the other end of which is firmly connected to the seat carrier, the detent element pulling into the direction away from the toothed element when the eccentric discs are released.

The actuation mechanism for releasing the seat back hinge mounting may be of any configuration. What matters is that it causes the eccentric discs to rotate in the direction allowing the detent element to move away from the toothed element. On the eccentric discs there may for example be provided coupling discs that are connected to the eccentric discs so as to take them along in one direction of rotation while allowing them to run idle in the other direction of rotation.

BRIEF DESCRIPTION OF THE DRAWINGS

The invention will be better understood with reference to the following Figs. The exemplary embodiment shown in the Figs. is only given by way of example and is not intended to limit the scope of the invention.

FIG. 1 shows a schematic diagram of a seat back hinge mounting of the invention in a view from the top; and FIG. 2 shows the seat back hinge mounting shown in FIG. 1 in a view from the side.

DETAILED DESCRIPTION

The FIGS. 1 and 2 show a seat back hinge mounting 20 connecting a seat carrier 22 to a seat back 24. Seat carrier 22 and seat back 24 are only represented in parts and are strongly simplified. A toothed element 26 is fastened to a bottom region of the seat back 24 which is turned toward the seat carrier 22. The toothed element 26 is configured in the shape of a plate and extends in portions parallel to the side surface of the seat carrier 22, protruding therefrom in parts. It is pivotal about a pivot 28 through which passes a pivot axis X-X, this resulting in that the seat back 24 is also pivotal about pivot 28. In the exemplary embodiment shown, the toothed element 26 flares toward its free arcuate end, with teeth 30 being disposed on an end side of the free end of the toothed element 26. The radius associated with the free arcuate end corresponds to a portion of an arc of a circle extending about the pivot axis X-X.

A detent element 32 is also fastened to the pivot 28, via a long hole 34. For the rest, the detent element 32 is freely movable. The maximum length 33 of the long hole 34 is disposed in such a manner that the detent element 32 is movable toward and away from the toothed element 26. The detent element 32 further also has an arcuate toothed region 36 that is disposed for cooperation with the teeth 30 of the toothed element 26. The curvature of the arcuate toothed region 36 corresponds thereby to the curvature of the arcuate free end of the toothed element 26. As best seen in FIG. 2, the detent element 32 extends from the toothed region 36 all the way to the free end in the region of the long hole 34, parallel to the toothed element 26, or the detent element 32 is interposed between seat carrier 22 and toothed element 26 in this region. Meaning, the detent element 32 is configured to be stepped in cross section so that the teeth 30 of the toothed element 26 may engage with the toothed region 36 or rather with the teeth 30 of the toothed region 36 whilst the pivot 28 extends all the way through the long hole 34 into the toothed element 26 or into a recess provided therein.

The detent element 32 further has a first inclined surface 38 and a second inclined surface 40 that are diagonally opposite and form together a kind of "V" shape. An extended portion 42, whose main extension is aligned with the longitudinal extension of the long hole 34, adjoins the inclined surfaces 38, 40. At the free end of the extended portion 42 there is disposed a traction spring 44 which urges or pulls the detent element 32 away from the toothed element 26. The force of the traction spring 44 and the length 33 of the long hole 34 are sufficient to move the teeth 30 of the toothed element 26 out of engagement from the toothed region 36 of the detent element 32.

In order to prevent the detent element 32 and the toothed element 26 from gliding apart, there are provided two eccentric discs, a first eccentric disc 46 and a second eccentric disc 48, that are each stationary but fastened, for rotation about an axis of rotation Y-Y, to the seat carrier 22. External surfaces 50 of the eccentric disc 48 form contact surfaces that cooperate with the inclined surfaces 38, 40. This means that the eccentric discs 46, 48 support the detent element 32 and, as a result thereof, the toothed element 26 and the seat back 24. The external surfaces 50 extend about the axes of rotation Y-Y of the eccentric discs 46, 48 in such a manner that the distance from the respective axis of rotation Y-Y in the circumferential direction increases in the one direction and decreases in the other direction. If the eccentric discs 46, 48 are rotated about the respective axis of rotation Y-Y, a pressure is exerted by the external surfaces 50 onto the inclined surfaces 38, 40 and is relieved in the other direction of rotation. What matters is that the eccentric discs 46, 48 are positioned and implemented in such a manner that they cause, by rotating, the teeth 30 of the toothed element 26 to move into engagement with the teeth 30 of the toothed region 36 and to completely move out engagement in the reverse direction of rotation.

If the detent element 32 and the toothed element 26 are engaged, a state of self-locking is achieved so that it is not possible to incline the seat back 24. The seat back 24 can only be adjusted if the eccentric discs 46, 48 are released.

Advantageously, the eccentric discs 46, 48 are spring-loaded so that they always apply the force of a spring onto the inclined surfaces 38, 40 and cause the detent element 32 to move into engagement with the toothed element 26 and to remain there. In the present exemplary embodiment, levers 52, which are joined together through an eccentric traction spring 54, are firmly mounted to the eccentric discs 46, 48.

Related to an imaginary mirror line extending alongside the detent element 32, through the pivot 28 and the extended portion 42, the two eccentric discs 46, 48 are arranged in a mirror-inverted fashion. This means that, in the exemplary embodiment shown, the levers 52 are arranged diagonally with respect to each other, with the distance between them diminishing in the direction of the detent element 32 and increasing in the direction of their free ends. At the end of the levers 52, there is respectively fastened the eccentric traction spring 54 that pulls the two levers 52 toward each other. This causes the eccentric discs 46, 48 to rotate in the direction in which the distance between the external surfaces 50 and the respective axis of rotation increases so that the detent element 32 is pushed toward the toothed element 26 as a result thereof.

If the force of the eccentric traction spring 54 is overcome, or if the eccentric discs 46, 48 are rotated in the opposite direction, the entire mechanism releases and the detent element 32 is pivotal about the pivot axis X-X. If the eccentric discs 46, 48 are then rotated back or if the eccentric traction spring 54 is again liberated, the external surfaces 50 adapt to the new position of the detent element 32 and retain the same in the desired position. It is also possible that the eccentric discs 46, 48 are rotated back so far that the teeth 30 of the toothed element 26 come out of engagement from the teeth 30 of the detent element 32 so that the seat back 24 is completely free to be tilted. In the desired position, the eccentric discs 46, 48 are rotated back or the eccentric traction spring 54 is again liberated and the teeth 30 look for the next possible detent position. The eccentric discs 46, 48 automatically find the exact position on the inclined surfaces 38, 40 so that the seat back 24 is retained in the desired position.

The present invention is not limited to the exemplary embodiment described but also includes all the embodiments having the same function. A plurality of different springs may for example be utilized. The levers 52 may also be implemented differently or, depending on the type of spring of the eccentrics 46, 48, be completely obviated.

What is claimed is:

1. A seat back hinge mounting for a motor vehicle seat comprising:
    a seat carrier;
    a seat back, the seat back being pivotal about a pivot adapted to be disposed on a vehicle seat;
    a toothed element firmly connected to the seat back and defining an arcuate end with teeth and is pivotal about a pivot axis (X-X) extending through the pivot;
    a detent element that is associated with the seat carrier and includes
        an arcuate region with teeth that is implemented and disposed in such a manner that the teeth of the detent element are adapted to be brought into engagement with the teeth of the toothed element,
    a long hole through which the pivot extends that is oriented in such a manner and has a length such that the detent element is movable in such a manner that the teeth of the detent element are movable into and out of engagement with the teeth of the toothed element,
        a first inclined surface and a second inclined surface opposing the first inclined surface, wherein the two inclined surfaces taper toward a free end of the detent element away from the seat back;
    a spring, wherein the detent element is urged by a force applied by the spring into a direction leading away from the toothed element; and
    a first eccentric disc and a second eccentric disc, each being fastened for rotation about a respective axis of rotation (Y-Y) on the seat carrier, the first eccentric disc contacting with its external surface the first inclined surface and the second eccentric disc contacting with its external surface the second inclined surface, the eccentric discs are spring-loaded in such a manner that they urge the detent element over the inclined surfaces toward the toothed element and retain the teeth in engagement.

2. The seat back hinge mounting as set forth in claim 1, wherein the inclined surfaces of the detent element merge into an extended portion that extends between the eccentric discs in a direction leading away from the toothed element.

3. The seat back hinge mounting as set forth in claim 1, wherein the eccentric discs are each firmly connected to a respective lever, with the levers being oriented approximately at right angles with respect to the inclined surfaces in a base position and having, on their side turned away from the respective inclined surface, a free end, and a spring element joining the two levers together and pulling them toward each other, thus urging the detent element over the inclined surfaces toward the toothed element.

4. The seat back hinge mounting as set forth in claim 3, wherein the arrangement and shape of the eccentric discs and levers as well as the width of an extended portion between the eccentric discs are chosen such that the levers are disposed at an angle of about 40° with respect to each other.

5. The seat back hinge mounting as set forth in claim 4, wherein there is provided an actuation mechanism by means of which the eccentric discs are rotatable about their axes of rotation (Y-Y).

6. A seat back hinge mounting for a motor vehicle seat comprising:
  a seat carrier;
  a seat back, the seat back being pivotal about a pivot adapted to be disposed on a vehicle seat;
  a toothed element firmly connected to the seat back and defining an arcuate end with teeth and is pivotal about a pivot axis (X-X) extending through the pivot;
  a detent element that is associated with the seat carrier and includes
    an arcuate region with teeth that is implemented and disposed in such a manner that the teeth of the detent element are adapted to be brought into engagement with the teeth of the toothed element,
    a long hole through which the pivot extends that is oriented in such a manner and has a length such that the detent element is movable in such a manner that the teeth of the detent element are movable into and out of engagement with the teeth of the toothed element,
    a first inclined surface and a second inclined surface opposing the first inclined surface, wherein the inclined surfaces merge into an extended portion that extends between first and second eccentric discs in a direction leading away from the toothed element, wherein a traction spring is fastened to the end of the extended portion and to the seat carrier in order to pull the detent element away from the toothed element; and
  the first eccentric disc and the second eccentric disc, each being fastened for rotation about a respective axis of rotation (Y-Y) on the seat carrier, the first eccentric disc contacting with its external surface the first inclined surface and the second eccentric disc contacting with its external surface the second inclined surface, the eccentric discs are spring-loaded in such a manner that they urge the detent element over the inclined surfaces toward the toothed element and retain the teeth in engagement.

7. A seat back hinge mounting for a motor vehicle seat comprising:
  a seat carrier;
  a seat back, the seat back being pivotal about a pivot adapted to be disposed on a vehicle seat;
  a toothed element firmly connected to the seat back and defining an arcuate end with teeth and is pivotal about a pivot axis (X-X) extending through the pivot;
  a detent element that is associated with the seat carrier and includes
    an arcuate region with teeth that is implemented and disposed in such a manner that the teeth of the detent element are adapted to be brought into engagement with the teeth of the toothed element,
    a long hole through which the pivot extends that is oriented in such a manner and has a length such that the detent element is movable in such a manner that the teeth of the detent element are movable into and out of engagement with the teeth of the toothed element,
    a first inclined surface and a second inclined surface opposing the first inclined surface, wherein the two inclined surfaces taper toward a free end of the detent element away from the seat back;
  a first eccentric disc and a second eccentric disc, each being fastened for rotation about a respective axis of rotation (Y-Y) on the seat carrier, the first eccentric disc contacting with its external surface the first inclined surface and the second eccentric disc contacting with its external surface the second inclined surface, the eccentric discs are spring-loaded in such a manner that they urge the detent element over the inclined surfaces toward the toothed element and retain the teeth in engagement; and
  an actuation mechanism by means of which the eccentric discs are rotatable about their axes of rotation (Y-Y).

8. The seat back hinge mounting as set forth in claim 7, wherein the detent element is urged by a force applied by a spring into a direction leading away from the toothed element.

9. The seat back hinge mounting as set forth in claim 7, wherein the inclined surfaces of the detent element merge into an extended portion that extends between the eccentric discs in a direction leading away from the toothed element.

10. The seat back hinge mounting as set forth in claim 9, wherein a traction spring is fastened to the end of the extended portion and to the seat carrier in order to pull the detent element away from the toothed element.

11. The seat back hinge mounting as set forth in claim 9, wherein the eccentric discs are each firmly connected to a respective lever, with the levers being oriented approximately at right angles with respect to the inclined surfaces in a base position and having, on their side turned away from the respective inclined surface, a free end, and a spring element joining the two levers together and pulling them toward each other, thus urging the detent element over the inclined surfaces toward the toothed element.

12. The seat back hinge mounting as set forth in claim 11, wherein the arrangement and shape of the eccentric discs and levers as well as the width of an extended portion between the eccentric discs are chosen such that the levers are disposed at an angle of about 40° with respect to each other.

* * * * *